Figure 4:
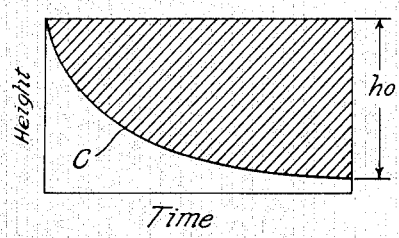

April 28, 1942.　　A. NADAI ET AL　　2,280,966
COMPRESSION TESTER FOR PLASTIC MATERIALS
Filed Jan. 26, 1940

WITNESSES:
C. J. Weller.
David Kreider.

INVENTORS
Arpad Nadai and
Harold C. Harrison.
BY
ATTORNEY

Patented Apr. 28, 1942

2,280,966

UNITED STATES PATENT OFFICE 2,280,966

COMPRESSION TESTER FOR PLASTIC MATERIALS

Arpad Nadai and Harold C. Harrison, Wilkinsburg, Pa., assignors to Westinghouse Electric & Manufacturing Company, East Pittsburgh, Pa., a corporation of Pennsylvania Application January 26, 1940, Serial No. 315,698

11 Claims. (Cl. 265—12)

Our invention relates to testing the mechanical properties of plastic material, and it has particular relation to a machine for testing the plasticity of wet clay or porcelain earth such as are used for making porcelain insulators and other ceramic bodies.

A reliable means for testing the plasticity of wet clay has long been needed in the ceramic industry. Recently a torsion machine was suggested for this purpose but since the tensile strength of wet clay or porcelain earth is very small, the specimens soon break in tension and thus fail to give an adequate indication of their mechanical properties.

Since clay and porcelain earth are actually deformed under compression in commercial practice, the ideal test for these substances is the compression test of a cylindrical specimen. A serious disadvantage, however, is caused by the lateral spreading of the test cylinder of clay when it is deformed by compression in such a test. Also the rate at which the cylinder is compressed should be clearly defined and kept constant, which requirement would ordinarily make it necessary to provide very complicated speed controls.

By means of our invention, the above disadvantages of the ordinary compression test are overcome. In the first place, the test cylinder is compressed at such velocity of the compression plates that the compression rate stays essentially constant. Rotating cutting wires keep the diameter of the clay cylinder constant so that the load is an indication of the stress, and difficulties resulting from the lateral spreading of the clay are entirely eliminated.

It is, accordingly, an object of our invention to provide apparatus for testing the mechanical properties of plastic material.

More specifically stated, it is an object of our invention to provide improved apparatus for applying a compression test to wet clay and porcelain earth to determine the mechanical properties thereof.

Other objects of our invention will become evident from the following detailed description taken in conjunction with the accompanying drawing, in which like parts are designated by like reference characters throughout the various figures.

Figure 3:
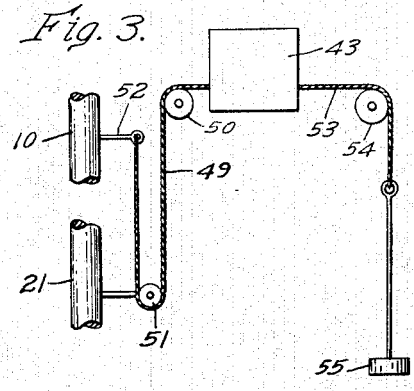
Figure 1:
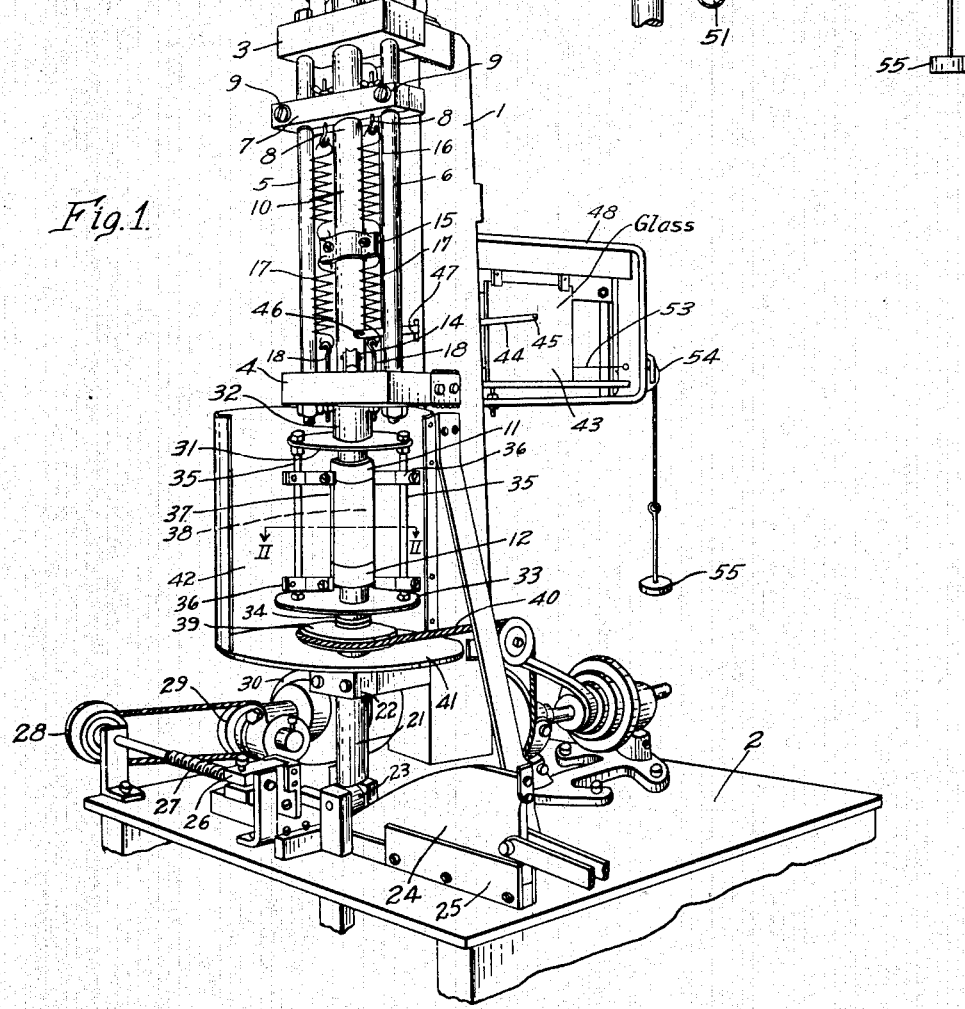
Figure 2:
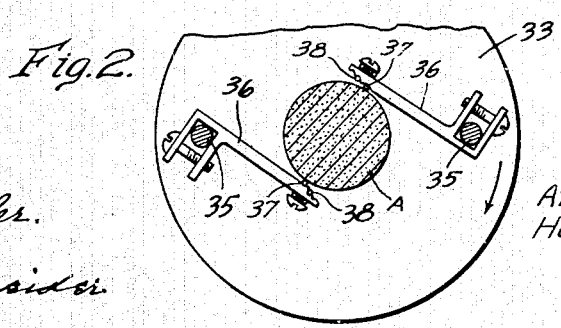

In the drawing:

Figure 1 is a view in perspective of testing apparatus built in accordance with my invention, Fig. 2 is an enlarged cross-sectional view taken along the line II—II of Fig. 1, Fig. 3 is a diagrammatic view of the indicating mechanism employed on the apparatus of Fig. 1, Fig. 4 is a graph illustrating the construction of the cam shown on the apparatus in Fig. 1.

Referring to Fig. 1 of the drawing, a standard 1 which is secured to a base 2 carries spaced supporting plates 3 and 4 between which pass a pair of stationary vertical bars 5 and 6. A split cross-piece 7, carrying a pair of eyebolts 8, is secured to the support 1 in a vertically adjustable position by bolts 9 which when tightened cause the two portions of the cross-piece to frictionally engage the bars 5 and 6. Supporting plate 3, cross-piece 7 and supporting plate 4 are provided with aligned circular holes through which extends a supporting rod 10 carrying at its lower end the upper plate 11 of a pair of circular compression plates 11 and 12. Rollers 13 and 14 disposed on supporting plates 3 and 4, respectively, act as guides for the rods 10 in its vertical movement. Adjustably secured to this rod 10 at a point between the lower supporting plate 4 and the cross-piece 7 in any suitable manner is a split metal clamp 15 having two pairs of relatively small holes near its upper and lower edges for receiving the ends of two pairs of helical springs 16 and 17. The upper ends of springs 16 are each secured to one of the eyebolts 8 on the cross-piece 7, and the lower ends of springs 17 are each attached to one of a pair of eyebolts 18 carried by the lower supporting plate 4. Accordingly, the rod 10 is resiliently supported in position. An arrangement including a pulley 19 and rope 20 is provided to counterweight this rod 10.

The lower compression plate 12 is secured to the upper end of a supporting rod 21 which passes freely through a guide or bearing 22 and carries a roller 23 at its lower end. The roller 23 rests upon the curved surface of a cam 24, the lower edge of which is seated in a horizontal guide 25. An internally screw-threaded member 26 is fixed to the forward part of the cam and engages a screw-threaded shaft 27 of a pulley 28. A belt connects the pulley 28 with a second pulley 29 driven by a motor 30 and by using other pulleys of different diameters a desired speed ratio between the shaft 27 and motor 30 may be obtained. The cam 24 is preferably designed with such a curved surface that when it is moved horizontally toward the pulley 28 at a constant velocity, a test cylinder A of plastic material disposed between the plates 11 and 12 is compressed at a constant rate of strain. A more detailed discussion of the shape of this cam will be found hereinafter.

A circular plate member 31 of larger diameter than the compression plates 11 and 12 has an integral concentric bearing portion 32 with an interior bearing surface contacting the surface of the supporting rod 10 and is rotatable thereabout. A similar plate member 33 is provided with a downwardly extending integral bearing portion 34 having its interior or bearing surface in rotatable engagement with the supporting rod 21. A pair of diametrically opposed vertical rods 35 are secured to the plates 31 and 33 to maintain them in spaced relationship, as indicated, and two pairs of vertically spaced horizontal arms 36, each pair carrying a pair of wires 37 and 38 are adjustably secured to the rods 35.

Secured to the outside of the lower bearing portion 34 is a pulley 39 arranged to be driven by a belt 40 which is in turn driven by the motor 30. The pulley 39 is rotatably supported on an annular bearing portion formed on the upper surface of a disk 41, the purpose of which will be hereinafter described. It will be evident that the rotation of the pulley 39 will result in the wires 37 and 38 rotating about the axis of the test piece A.

The rotating cutter mechanism will be better understood upon reference to the horizontal sectional view of Fig. 2 wherein the same parts are designated by the same reference characters as in Fig. 1. Both pairs of wires 37, 38 are disposed substantially parallel to the axis of the test cylinder and, for rotation of the plate 33 in the direction indicated by the arrow, the leading wire 37 of each pair is arranged to either contact or very nearly contact the peripheries of the compression plates 11 and 12. The function of the wire 37 is to cut away that part of the test cylinder A which bulges out at the sides during the test. These wires must be relatively thin in order to make a clean cut, and, because of their small cross-section, often permit the cut fragments to adhere to the surface of the test piece. In order to prevent these scraps from disturbing the results of the test we prefer to provide the second wire 38, trailing the cutting wire 37 and displaced slightly from the surface of the test cylinder. While it has been found that in most cases one such additional wire satisfactorily removes these scraps, it will be evident that the number of wires may be changed as desired.

The disk 41 forms the bottom of a guard 42 for collecting the fragments from the test cylinder and thus preventing them from scattering on the apparatus and surroundings. The remainder of this guard preferably comprises a cylindrical portion made up of a pair of conveniently connectable sections, only one of which is shown.

The stress-strain curve of the test cylinder A is automatically indicated on a glass plate 43 covered with lamp black or paper. An arm 44, having at one end a stylus 45 and pivoted at its other end about a pin 46 on the supporting rod 10, is pivotally secured at a point intermediate its ends to the standard 1 by a pin 47. The vertical movement of the rod 10 and consequently that of the stylus 45 indicates the stress on the test piece.

The recording plate 43 is arranged for horizontal movement within a supporting frame 48 and, as is better shown in Fig. 3, has a light belt or cord 49 attached to its inner end. This cord 49 passes horizontally over a stationary pulley 50 which may be attached to the standard 1 and from there extends vertically downward to another pulley 51 which is secured to the movable lower supporting rod 21. After passing over the pulley 51 the cord extends vertically upward and is attached at its end to a stud 52 disposed on the upper supporting rod 10. Attached to the outside end of the plate 43 is another cord 53 which passes horizontally to a pulley 54 disposed on the supporting frame 48 and carries a weight 55 on its other end. The purpose of the weight 55 is to retain the cord 49 taut so that the horizontal movement of the plate 43 is directly proportional to the change in distance between pulley 51 and the stud 52 and consequently to the change in height of the test piece A during a test.

The cam 24 for compressing the test piece may be of the same shape as the cross-hatched area which is partly bounded by the curve C of Fig. 4. This curve is an exponential having the equation $$h = h_0 e^{\bar{v} t}$$

in which $h$ represents the height and is plotted vertically while $t$ represents the time and is plotted horizontally. The constant $h_0$ represents the height of the test piece A at the start of the compression test. As is desirable, in order to obtain uniform results in such a test, the true strain rate $\bar{v}$, which is negative in the case of a compression test, is maintained constant.

That a uniform strain rate results when the cam 24 is designed in accordance with the above can be demonstrated as follows:

The true compression rate $\bar{v}$ of the test piece A is given by the following equation:

$$\bar{v} = \frac{d\bar{\epsilon}}{dt} = \frac{1}{1+\epsilon}\frac{d\epsilon}{dt}$$

where $$\bar{\epsilon} = \ln(1+\epsilon) = \text{the true strain, and}$$

$$\epsilon = \frac{h - h_0}{h_0} = \text{the conventional or apparent strain.}$$

Since $$1 + \epsilon = \frac{h}{h_0} \text{ and } d\epsilon = \frac{dh}{h_0}$$

$$\bar{v} = \frac{dh}{h\,dt} \text{ or } \ln h + C = \bar{v} t$$

When $$t = 0, \; h = h_0 \text{ and } C = \ln h$$

Thus $$h = h_0 e^{\bar{v} t} \text{ where } \bar{v} \text{ is negative for a compression test}$$

The operation of the above described apparatus may be set forth as follows: The cam 24 is located at its position most remote from the screw threaded shaft 27 and the substantially cylindrical test piece A, extruded from the batch of wet clay or porcelain earth, is disposed between the plates 11 and 12 which are then at the positions most remote from each other. The glass plate 43 with its covering of lamp black is positioned at the left end of its travel as shown on the drawing. The motor 30 is operated to drive the pulley 28 at a selected constant speed, thus moving the cam 24 horizontally at a constant velocity and compressing the test cylinder A at a uniform rate. At the same time the pulley 39 is driven rotating the cutting mechanism including the wires 37 and 38 to maintain the cross-section of the test piece constant. At the same time, the stress-strain curve is recorded on the glass plate. The guard 42 prevents the fragments of clay cut off by these wires from falling onto the apparatus or surroundings. Throughout the test the vertical position of the stylus 45 will indicate the stress on the test cylinder A while the indicating plate 43 will move horizontally in accordance with the resulting strain.

Although we have shown and described a specific embodiment of our invention, we are fully aware that many modifications thereof are possible. The invention, therefore, is not to be restricted except insofar as is necessitated by the prior art and by the spirit of the appended claims.

We claim as our invention:

1. Apparatus for testing plastic material comprising means for compressing a test piece at a predetermined rate, means for cutting off portions bulging from said test piece as a result of the compressive force to maintain constant the cross-sectional area thereof in a plane perpendicular to the direction of the compressive force, and means for indicating the reaction of said test piece to said stress.

2. Apparatus for testing plastic material comprising a pair of compression plates arranged to receive a test piece therebetween, spring mounting means for one of said compression plates, cam means arranged to move the other of said compression plates to compress said test piece at a predetermined rate, a cutter for maintaining constant the cross-sectional area of said test piece in a plane perpendicular to the direction of the compressive force, and means for indicating the effect of the stress on said test piece.

3. Apparatus for testing plastic material comprising a pair of compression plates arranged to receive a test piece therebetween, spring mounting means for one of said compression plates, cam means for moving the other of said compression plates to compress said test piece at a predetermined rate, means for maintaining constant the cross-section of said test piece including a cutter and means for rotating said cutter about the axis of compression of said test piece, and means responsive to the pressure on said spring mounting means for indicating the effect of the stress on said test piece.

4. Apparatus for testing plastic material comprising a pair of circular compression plates arranged to receive a test piece therebetween, means for moving one of said compression plates at such a rate that said test piece will be compressed at a constant rate, means for maintaining constant the cross-section of said test piece including a cutter parallel to the axis of compression of said test piece and means for rotating said cutter about said axis, and means for indicating the effect of said stress on said test piece.

5. Apparatus for testing plastic material comprising a pair of circular compression plates arranged to receive a test piece therebetween, spring mounting means for one of said compression plates, cam means arranged to move the other of said compression plates to compress said test piece at a predetermined rate when said cam means is moved linearly at a constant velocity, means for moving said cam linearly at such constant velocity, means for maintaining constant the cross-section of said test piece including a cutter and means for rotating said cutter about the axis of compression of said test piece, and means responsive to the pressure on said spring mounting means for indicating the effect of said stress on said test piece.

6. Apparatus for testing plastic material comprising a pair of plates arranged to apply a substantially vertical compressive force to a test piece disposed therebetween, spring mounting means for the upper of said plates, substantially perpendicular supporting means carrying the lower of said plates, cam means engaging the lower end of said supporting means to move said means at such rate that said test piece will be compressed at a constant rate when said cam means is moved linearly at a constant velocity, means for moving said cam means linearly at a constant velocity, means for maintaining said test piece in the form of a cylinder having a constant circular cross-section including a cutting wire parallel to the axis of said test piece and contacting the surface thereof, means for rotating said cutting wire about said axis of said test piece, and means responsive to the pressure on said spring mounting means for indicating the stress-strain relationship during the test.

7. Testing apparatus comprising a pair of plates for applying a compressive force to a test cylinder of plastic material disposed therebetween, spring mounting means for one of said plates, a cam for moving the other of said plates at a predetermined rate, means for moving said cam, a cutter for maintaining the diameter of said test cylinder constant during the compression thereof, said cutter including a cutting wire disposed parallel to the axis of compression of said test cylinder to contact the surface thereof and an auxiliary wire disposed parallel to said cutting wire to turn the plastic material cut by said cutting wire away from the surface of said cylinder, means for rotating said cutter about said axis of compression and means for indicating the effect of said stress on said test cylinder.

8. Testing apparatus comprising means for compressing a cylindrical test piece of plastic material along its axis, a cutting element, means for causing relative movement between said cutting element and the test piece to maintain the diameter of said test piece constant, and means for indicating the effect of the compression on said test piece.

9. Testing apparatus comprising a pair of circular compression plates for receiving a test cylinder of plastic material therebetween, means for relatively moving said plates to compress said test cylinder along its axis, a cutting wire parallel to the axis of said test cylinder, means for rotating said cutting wire about said test cylinder in contact with the surface thereof to maintain its cross-section constant, and means for indicating the effect of the compression on said test cylinder.

10. Testing apparatus comprising a pair of spaced circular plates for receiving a test cylinder of plastic material therebetween, means for compressing said test cylinder along its axis between said plates, a cutter for maintaining constant the cross-section of said test piece perpendicular to its axis, said cutter including a cutting wire disposed parallel to said axis to contact the surface of said test piece and an auxiliary wire parallel to said cutting wire to turn the plastic material removed by said cutting wire away from the surface of said test cylinder, means for rotating said cutter about said axis, and means for indicating the effect of the compression on said test cylinder.

11. Testing apparatus comprising means for compressing a cylindrical test piece of plastic material along its axis, a cutting element, means for moving said cutting element about the axis of said test piece to maintain the diameter thereof constant, guard means for collecting the material cut off by said cutting element, and means for indicating the effect of the compression upon said test cylinder.

ARPAD NADAI.
HAROLD C. HARRISON.